W. T. GALLAGHER.
ANIMAL TRAP.
APPLICATION FILED FEB. 25, 1910.
998,166.
Patented July 18, 1911.
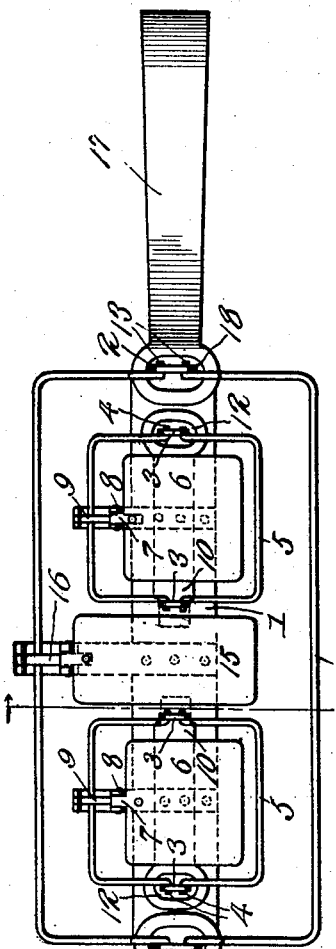
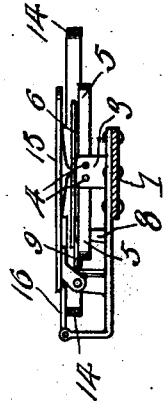
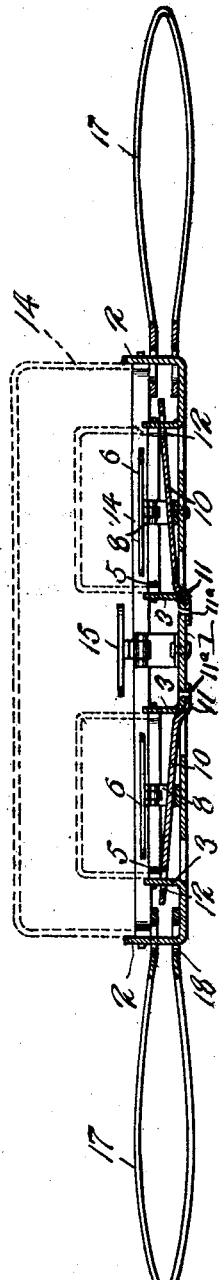
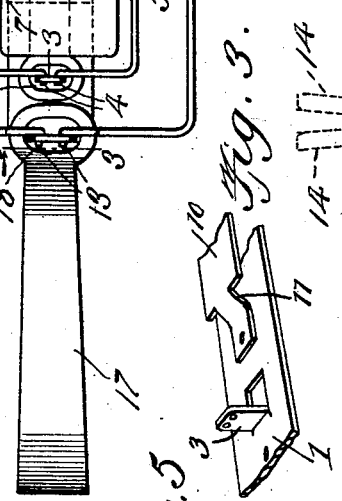
Witnesses
Frank B. Hoffman
Wm. J. Roerth.
Inventor
William T. Gallagher
By Victor J. Evans
Attorney

UNITED STATES PATENT OFFICE.

WILLIAM T. GALLAGHER, OF RICHMOND, VIRGINIA, ASSIGNOR OF ONE-HALF TO WILLIAM STIRTZ, OF RICHMOND, VIRGINIA.

ANIMAL-TRAP.

998,166. Specification of Letters Patent. Patented July 18, 1911.

Application filed February 25, 1910. Serial No. 545,842.

*To all whom it may concern:*

Be it known that I, WILLIAM T. GALLAGHER, a citizen of the United States, residing at Richmond, in the county of Henrico and State of Virginia, have invented new and useful Improvements in Animal-Traps, of which the following is a specification.

This invention relates to traps for animals, and the object of the invention is to provide a trap provided with a plurality of small jaws and a pair of large jaws which entirely inclose the small jaws, the locking member of the larger jaws being extremely sensitive so that the movement of an animal having its foot caught within one of the smaller jaws will operate the trigger of the larger jaws to effectively secure the said animal.

With the above, and other objects in view, which will appear as the description progresses, the invention resides in the novel construction and combination of parts hereinafter fully described and claimed.

In the accompanying drawings there has been illustrated a simple and preferred embodiment of the improvement, and in which drawings, Figure 1 is a top plan view of a trap constructed in accordance with the present invention and showing the jaws thereof in their open position. Fig. 2 is a central longitudinal sectional view of the same, the dotted lines indicating the jaws in their closed position. Fig. 3 is a sectional view taken upon the line 3—3 of Fig. 1 and looking in the direction of the arrow. Fig. 4 is a sectional view taken upon the line 4—4 Fig. 1. Fig. 5 is a detail of the fragmentary parts in arbitrary relation to each other and illustrating the tongue 10 ready for insertion in the opening beneath the ear 3.

In the accompanying drawings the numeral 1 designates the base plate of the improved trap. This base plate 1 is constructed of some suitable metal having its opposite ends upset as designated by the numeral 2. The bottom of the rectangular base 1 is further provided with slitted portions, and the metal formed between these slits is bent upwardly to provide the spaced ears 3. By reference to the several figures of the drawing, it will be noted that the ears 3 are arranged in pairs and both of the said ears are each provided adjacent their top edges with a pair of spaced openings, the same being adapted for the reception of the offset portions 4 of substantially U-shaped jaw members 5. In the device illustrated in the drawing two sets of jaw members 5 are employed, but it is obvious that a greater number of said jaws may be used if desired. The jaws 5, while described as substantially U-shaped members each comprise a pair of arms in a substantially parallel plane and a connecting member arranged at a substantially right angle to the arms.

Positioned between the jaws 5 is a tripping plate or pan 6, the same having a rearwardly extending arm 7 which is pivotally connected with an upright member 8, and the said extension is provided with a suitable lip which is adapted to engage with a latch 9 in the ordinary manner and whereby pressure upon the tripping plate or pan 6 releases the latch 7 so as to allow the jaws 5 to swing vertically and into engagement with each other.

The numeral 10 designates the spring member which forces the jaws 5 together when the tripping plate or pan 6 is operated. Each of these springs 10 comprises a single strip of resilient material, having one of its ends reduced to provide the projecting tongues 11 which is adapted to be inserted through the opening provided by one of the ears 3 and to be secured to the base 1 through the medium of suitable rivets 11$^a$. It is to be understood that the shoulders adjacent the reduced tongue contact with the ear 3 and the top of the base adjacent the walls provided by the openings. The opposite end of the spring 10 is provided with an elongated opening 12 which is inserted over the opposite ear 3 and bears against the offset arms of the jaw members 5.

The offset ends 2 of the base plate 1 are each provided, adjacent their upper extremities with a pair of spaced openings, the same being adapted for the reception of offset members or lugs 13 provided upon a pair of substantially U-shaped jaw members 14. These jaw members 14, it will be noted by reference to the drawing, entirely surround the smaller jaw members 5 and pivotally connected with the base 1 is a centrally arranged tripping plate or pan 15, which has an offset lip adapted to engage with a latch member 16 to hold the jaws 14 in their open position. The lip provided by the pan 15 only slightly engages with the latch member 16, so that a slight movement or shaking of the trap will cause the lip to become disengaged from the said member 16 and allow the jaws 14 to close in a manner now to be described.

The numeral 17 designates a pair of double arm springs. Each of these springs has its ends provided with elongated openings 18, the same being positioned upon the upset ends 2 of the base member 1 and the upper arm of each of the said springs being adapted to contact with the offset arms of the jaws 14, so when the catch 16 is released, to allow the said jaws to swing upwardly toward each other. By reference to Fig. 3 of the drawings, it will be noted that the jaws 14, when in their swung position do not contact with each other, the side arms of the said jaws being provided with offsets to prevent such an action and the object of this construction will presently be set forth.

It is a well known fact among trappers that an animal having its foot caught within a trap uses every effort to dislodge the said foot and even resorts to gnawing the foot in order to obtain his release. In the device above described, it will be noted that none of the jaws 5 or 14 are provided with teeth so that the same will not injure the fur of the animals caught therebetween. Should an animal have its paw caught between one of the pairs of jaws 5 the animal will at first make an effort to release himself and in this effort the animal is liable to turn around so as to contact with the plate 16 or the opposite plate 6, causing the jaws of each of these members to be swung into engagement with the leg and foot of the animal. The jaws 14 are of such a size as to engage the animal above its ankle and as the upper portion of the leg is of a greater size than the ankle the spread upper portions of the jaws 14 will sufficiently contact with the leg of the animal to prevent its escape therefrom. It is also a well known fact among trappers that the portion of the leg secured by the trap as well as beneath the jaws of the trap swells and this swelling will also tend to prevent the removal of the leg of the animal from the trap.

From the above description, taken in connection with the accompanying drawings, it will be noted that I have provided a comparatively simple and thoroughly effective device for the purpose intended, one which will not injure the fur of the animal and which will effectively prevent the said animal from gnawing his foot and thereby escaping from the trap, one wherein the jaws 14 are retained in open position by what may be termed a hair trigger which is easily operated so as to cause the closure of the jaws by the mere movement of the trap, and it is to be understood that while I have illustrated and described the preferred embodiment of the improvement, as it now appears to me, minor details of construction within the scope of the following claims may be resorted to if desired.

Having thus fully described the invention, what I claim as new is:—

1. A trap of the class described, a rectangular base provided with upset ends, a plurality of spaced ears upon the base, said ears having their upper extremities provided with a pair of spaced openings, U-shaped jaws having offsets engaging within these openings, a pan member to each of the pairs of jaws, a latch connected with the pan, a flat spring carried by the base and engaging the offset arms of each of the pairs of jaws, the upset ends of the base having a pair of spaced openings, U-shaped jaws having offsets engaging these openings, said jaws surrounding the first named jaws, a pan upon the plate intermediate of the first named jaws, a latch normally engaging the plate and one of the larger jaws, and double spring members contacting the offset arms of the larger jaws.

2. A trap comprising a rectangular base member provided with upset ends, the said base member being provided with ears arranged in pairs, a pair of jaw members pivotally connected to each pair of ears, a flattened spring member having one of its ends provided with an elongated opening positioned upon one of the ears and contacting one of the offset arms of each pair of jaws, a pan between the jaws, said tripping pans being each provided with a lip, a catch pivotally connected with the base and adapted to normally engage the lip of the tripping pan, a pair of larger jaws encircling the smaller jaws and pivotally connected with the upset ends of the base, a tripping pan pivotally connected with the base and between the smaller jaws, a latch member lightly engaging the tripping pan, and double arm spring members having their ends provided with openings positioned upon the upset end of the base and adapted to bear against the offset arms of the larger jaw members.

3. In a trap of the class described, a rectangular base provided with upset ends, said base being provided with upturned ears arranged in pairs, a pair of U-shaped jaws pivotally connected between each pair of ears, a spring member for these jaws, said spring comprising a single rectangular member having one of its ends offset and engaging beneath the base and its opposite end provided with an elongated opening adapted to be positioned upon one of the ears and to contact with the jaws pivotally connected with said ear, tripping mechanism for operating these jaws, a pair of oppositely disposed enlarged jaws pivotally connected with the upset ends of the base, a double arm spring engaging these jaws to normally force the same toward each other, said jaws being provided with offset portions adapted to contact with each other to prevent the longitudinal members of the said jaws contacting with each other, and a hair trigger positioned between the smaller pair of jaws to retain the larger jaws in their open position.

In testimony whereof I affix my signature in presence of two witnesses.

WILLIAM T. GALLAGHER.

Witnesses:
L. B. SIMS,
WILLIAM C. STERTZ.

Copies of this patent may be obtained for five cents each, by addressing the "Commissioner of Patents, Washington, D. C."